(12) United States Patent
Lowe

(10) Patent No.: US 8,232,862 B2
(45) Date of Patent: Jul. 31, 2012

(54) BIOMETRICALLY AUTHENTICATED PORTABLE ACCESS DEVICE

(75) Inventor: Peter R Lowe, Peyton, CO (US)

(73) Assignee: Assa Abloy AB (SE)

( * ) Notice: Subject to any disclaimer, the term of this patent is extended or adjusted under 35 U.S.C. 154(b) by 1493 days.

(21) Appl. No.: 10/847,542

(22) Filed: May 17, 2004

(65) Prior Publication Data

US 2005/0253683 A1   Nov. 17, 2005

(51) Int. Cl.
*G05B 23/00* (2006.01)

(52) U.S. Cl. ...................................................... 340/5.53

(58) Field of Classification Search .............. 340/5.53, 340/5.83, 5.28, 10.1, 10.5, 10.51, 5.8; 713/169, 713/170, 186; 235/462.46; 257/724
See application file for complete search history.

(56) References Cited

U.S. PATENT DOCUMENTS

| | | | |
|---|---|---|---|
| 3,967,224 A * | 6/1976 | Seeley | 335/151 |
| 4,582,985 A | 4/1986 | Löfberg | |
| 4,993,068 A | 2/1991 | Piosenka et al. | |
| 5,131,038 A | 7/1992 | Puhl et al. | |
| 5,481,265 A | 1/1996 | Russell | |
| 5,481,610 A | 1/1996 | Doiron et al. | |
| 5,483,595 A | 1/1996 | Owen | |
| 5,623,637 A | 4/1997 | Jones et al. | |
| 5,680,460 A | 10/1997 | Tomko et al. | |
| 5,705,991 A * | 1/1998 | Kniffin et al. | 340/5.28 |
| 5,729,220 A | 3/1998 | Russell | |
| 5,937,065 A | 8/1999 | Simon et al. | |
| 6,011,858 A | 1/2000 | Stock et al. | |
| 6,016,476 A | 1/2000 | Maes et al. | |
| 6,035,398 A | 3/2000 | Bjorn | |
| 6,038,551 A | 3/2000 | Barlow et al. | |
| 6,038,666 A | 3/2000 | Hsu et al. | |
| 6,078,265 A | 6/2000 | Bonder et al. | |
| 6,201,484 B1 | 3/2001 | Russell | |
| 6,208,235 B1 * | 3/2001 | Trontelj | 340/10.1 |
| 6,353,889 B1 * | 3/2002 | Hollingshead | 713/169 |
| 6,441,482 B1 * | 8/2002 | Foster | 257/724 |
| 6,441,770 B2 | 8/2002 | Russell | |
| 6,672,512 B2 * | 1/2004 | Bridgelall | 235/462.46 |
| 6,819,219 B1 * | 11/2004 | Bolle et al. | 340/5.52 |
| 2003/0200778 A1 | 10/2003 | Chhatwal | |

(Continued)

FOREIGN PATENT DOCUMENTS

WO   WO 01/41032   6/2001

OTHER PUBLICATIONS

International Search Report for International (PCT) Patent Application No. PCT/US05/02142, mailed Jul. 18, 2005.

(Continued)

*Primary Examiner* — Vernal Brown
(74) *Attorney, Agent, or Firm* — Sheridan Ross P.C.

(57) ABSTRACT

A biometrically authenticated portable access device, includes a biometric sensor for measuring a live biometric parameter of an unverified user, an authenticator controlling a switch that enables and disables a conventional RFID tag and a stored biometric template corresponding to a previously measured biometric parameter of an authorized user. The authenticator compares the live biometric parameter of the unverified user to the stored biometric template and enables the RFID tag when the live biometric parameter matches the stored biometric template. The RFID tag is programmable in conventional RFID tag programmers that may be proprietary permitting the portable access device to be used with existing installed systems of proprietary and non-proprietary RFID tag programmers and readers.

19 Claims, 1 Drawing Sheet

U.S. PATENT DOCUMENTS

2005/0039027 A1\* 2/2005 Shapiro .................. 713/186

OTHER PUBLICATIONS

Written Opinion for International (PCT) Patent Application No. PCT/US05/02142, mailed Jul. 18, 2005.

International Preliminary Report of Patentability for International (PCT) Patent Application No. PCT/US05/02142, mailed Apr. 2, 2007.

Examiner's First Report on Patent Application No. 2005251339, mailed Dec. 8, 2008.

\* cited by examiner

BIOMETRICALLY AUTHENTICATED PORTABLE ACCESS DEVICE

BACKGROUND OF THE INVENTION

1. Field of the Invention

The present invention relates to biometrically authenticated access control in which a wireless authorization signal is sent from a portable unit, such as a key fob, after a biometric sensor on the portable unit has verified the identity of the user.

More specifically, the present invention relates to radio frequency identification (RFID) technology used in such devices.

2. Description of Related Art

Radio Frequency Identification (RFID) systems use an RFID reader to wirelessly detect the presence of a nearby RFID tag and read an identification code stored in the tag. The identification code in the RFID tag can be used to control access to a protected resource by allowing access only when an RFID tag having an authorized identification code is detected. Generally, the authorized RFID tag is issued to an authorized user to ensure that only the authorized user has access to the protected resource. If the authorized RFID tag is lost or stolen, however, it can be presented by an unauthorized user to access the protected resource.

One exemplary use for RFID tags is to install them in a key fob associated with one or more conventional mechanical keys. An RFID tag reader is then positioned near a lock system operated by a mechanical key kept on a ring with the key fob. To open the lock system, the correct mechanical key must be used, and an authorized RFID tag must be detected by the nearby tag reader.

To ensure that the RFID tag is in the possession of the authorized user to whom it was originally issued, newer designs for RFID access control systems have added a biometric sensor. The sensor, such as a semiconductor-based fingerprint reader, is located in a portable unit, such as a key fob, that contains an RFID engine to simulate the presence of an RFID tag. The biometric sensor includes a stored template of the authorized user's fingerprint.

The present state of the art in this field uses an RFID engine specifically designed from generic logic elements to simulate the operation of an RFID tag used with an existing RFID system. Such a system is provided by Privaris, Inc. of Charlottesville Va., which offers both key fob designs and smart card designs with an RFID engine simulating an RFID tag and an integrated fingerprint reader for biometric verification.

There is a large installed base of non-biometric RFID systems made by such companies as HID Corporation of Irvine Calif., Indala Corporation of San Jose Calif. and others that would benefit from the additional layer of security provided by biometric authentication. The presently available installed RFID systems use a variety of different complex coding and signaling methods, some of which are proprietary. The RFID tags used with these systems take two forms—cards and key fobs. In both cases the coding of the tags is done in a conveyor belt form where the tag moves past a programming/verification head where the RFID identification code is put in under the control of a computer. The code is specified by the customer from a very large range of options.

In general these companies do not allow third parties to program the RFID tags used with their RFID system except in the case of using certain leased card programmers which are provided to trusted distributors for use with RFID tags that they provide to their customers. The coding that these leased programmers can embed is limited to certain specific ranges and formats allowed by each of the distributors and controlled by an encrypted media, which is supplied by each of the companies.

There is also a non-proprietary, non-controlled format available, which is known as "26 bit wiegand." This format is not recommended for high security applications and is not appropriate for use where biometric verification is used as a secondary layer of security.

The proprietary nature of the coding and signaling of existing installed systems, the restrictions on programming, as well as technical considerations make it difficult to simulate the operation of existing proprietary RFID tags with an RFID engine constructed from generic logic elements. Owners of proprietary RFID systems are often unwilling to disclose details of the proprietary system that are needed for simulation in an RFID engine.

Moreover, even where such information is available, the programming procedure for an RFID engine simulating an RFID tag may be incompatible with the installed base of programmers used with the proprietary system. There is a need for a portable biometrically authenticated RFID device, such as a key fob, that uses a securely integrated authorized RFID tag of an existing prior art type, instead of a simulation of such a tag in an RFID engine. Such a device could be securely programmed in existing RFID programmers and distributed and controlled by the owner of the proprietary RFID system using existing channels and methods.

Bearing in mind the problems and deficiencies of the prior art, it is therefore an object of the present invention to provide a biometrically authenticated access device that is compatible with and programmable by an existing installed base of RFID tag programmers.

It is another object of the present invention to provide a biometrically authenticated access device that has a relatively low manufacturing cost.

Still other objects and advantages of the invention will in part be obvious and will in part be apparent from the specification.

SUMMARY OF THE INVENTION

The above and other objects, which will be apparent to those skilled in art, are achieved in the present invention which is directed to a biometrically authenticated portable RFID access device that includes a biometric sensor for measuring a live biometric parameter of an unverified user, a stored biometric template corresponding to a previously measured biometric parameter of an authorized user, and an authenticator for comparing the live biometric parameter to the stored biometric template. The authenticator, which is typically a microprocessor, produces an authorization signal when the live biometric parameter matches the stored biometric template.

An electronic switch is connected to the authenticator and enables an RFID tag when the authorization signal from the authenticator indicates that the live biometric parameter matches the stored biometric template. The RFID tag is a conventional RFID tag programmable in a conventional RFID tag programmer selected from an installed base of RFID programmers used for programming RFID tags that do not include associated biometric sensors. The use of a conventional RFID tag allows the portable RFID access device to be programmed by and used with existing installed systems of proprietary and non-proprietary readers and programmers.

The electronic switch may be connected to prevent power from being wirelessly supplied to the RFID tag by an RFID tag reader, to prevent oscillation of a tuned circuit within the RFID tag, to connect a power input to a ground input of the RFID tag to prevent an operating voltage from being provided to the RFID tag, to connect or disconnect a critical component to the access device or in some combination of the above so as to disable and enable operation of the RFID tag. The authorization signal may be a positive or negative signal, and the switch may open or close upon receipt of the authorization signal.

The electronic switch is preferably physically protected by potting material or a film such that the switch is destroyed in the event that an attempt is made to access the switch. The biometric sensor preferably measures thumbprints or fingerprints, but may measure some other biometric parameter, such as voice or iris patterns of the eye.

The authenticator preferably includes a timer that provides the authorization signal to the switch for a limited period of time after the authenticator has determined that the live biometric parameter matches the stored biometric template. The portable RFID access device may be constructed with the authenticator initially in a locked state providing the authorization signal to the switch. This enables the RFID tag and permits it to be assigned RFID access credentials and programmed by a conventional RFID tag programmer. The authenticator can be subsequently changed to an unlocked state thereby disabling the RFID tag unless the live biometric parameter matches the stored biometric template.

In one embodiment of the present invention, the authenticator is changed to the unlocked state by irreversibly burning a fuse in the authenticator. In an alternative embodiment, the authenticator includes a port and the authenticator is changed to the unlocked state by entering a secret code through the port.

BRIEF DESCRIPTION OF THE DRAWINGS

The features of the invention believed to be novel and the elements characteristic of the invention are set forth with particularity in the appended claims. The figures are for illustration purposes only and are not drawn to scale. The invention itself, however, both as to organization and method of operation, may best be understood by reference to the detailed description which follows taken in conjunction with the accompanying drawings in which:

DESCRIPTION OF THE PREFERRED EMBODIMENT(S)

In describing the preferred embodiment of the present invention, reference will be made herein to FIGS. 1-3 of the drawings in which like numerals refer to like features of the invention.

Figure 1:
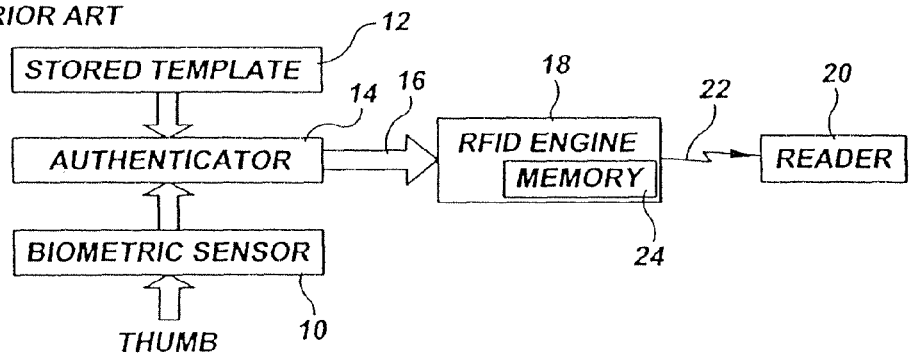
FIG. 1 is a block diagram of a prior art biometrically authenticated portable RFID access device using an RFID engine constructed from generic logic elements to simulate an RFID tag.

A block diagram of a typical prior art biometric key fob is shown in FIG. 1. An authorized user verifies his identity to the key fob using a biometric sensor 10. The biometric sensor is typically a semiconductor device capable of detecting the location of ridges forming a user's fingerprint as the ridges contact the sensor. In a conventional design, the user's thumb is applied to the biometric sensor, which produces a live authentication signature corresponding to the user's thumbprint.

A previously established authentication signature corresponding to the authorized user's thumbprint is located in stored biometric template 12. The authenticator 14 compares the live biometric parameter measured by the biometric sensor 10 to the stored biometric template 12 for the authorized user and produces an authorization signal at 16 when the live biometric parameter matches the stored biometric template 12. The authorization signal may be a positive or negative signal, and the switch may open or close upon receipt of the authorization signal.

The stored template is stored in a digital memory that is readable by the authenticator 14. The template is typically a signature that corresponds to the thumbprint or a fingerprint. In most designs, the actual thumbprint cannot be determined solely from the signature of the thumbprint.

The authorization signal 16 enables the RFID engine 18 to interact with an RFID reader 20 over a wireless link 22. In this prior art design, the RFID reader 20 thinks it is exciting a conventional RFID tag in a conventional smart card or key fob. Instead, it is interacting with an RFID engine constructed from common logic elements, which is simulating the communication and response of a conventional RFID tag. The RFID engine 18 holds an RFID code in non-volatile memory 24.

The RFID code in non-volatile memory 24 identifies the access device to the reader 20 during the communication between the RFID engine and reader over wireless link 22. Because the user has been authenticated to the access device via the authenticator 14, and the access device has been authenticated to the reader 20 via the RFID access code credentials in memory 24, the reader can verify that the authorized user is in possession of the access device.

Figure 2:
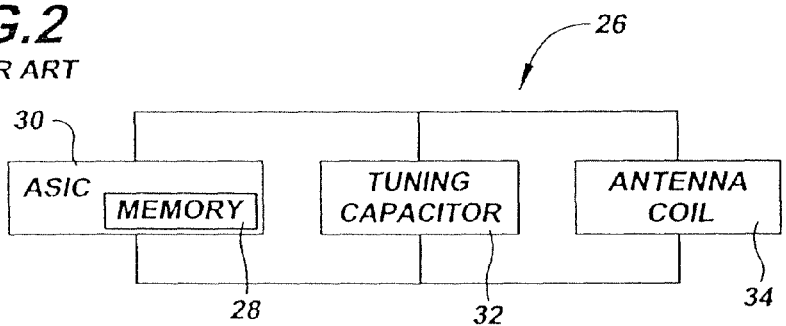
FIG. 2 is a block diagram of a prior art RFID tag.

FIG. 2 shows a simple conventional RFID tag 26 used with a conventional non-biometric RFID system. In such a system, a fixed reader wirelessly reads an ID code stored in memory 28 of an application specific integrated circuit (ASIC) 30. The ASIC will incorporate the proprietary features of the communication protocol used to send the ID code in memory 28 and identify the RFID tag to the reader.

The RFID tag of FIG. 2 includes a tuning capacitor 32 and an antenna coil 34. In the design shown in FIG. 2, the RFID tag is not provided with a battery or other source of stored energy. It is powered by a signal continuously transmitted on a designated radio frequency by a compatible RFID tag reader. When the tag is brought within range of the reader a tuned circuit, formed by the tuning capacitor 32 and antenna coil 34, begins to oscillate.

These oscillations are tapped to provide power to the RFID tag. In this way, the RFID reader supplies power over the wireless link to the RFID tag. The ASIC 30 modulates the oscillations of the tuned circuit, and these modulations produce a backscattered signal that is detected by the RFID reader. The ASIC 30 reads the stored ID in the memory 28 and transmits the ID to the reader via this modulation and backscattering process. The conventional prior art RFID tag in FIG. 2 that is compatible with an installed base of RFID readers can only verify to a reader that the tag is in the vicinity of the reader. It cannot verify that the tag is in the possession of the authorized user to whom the tag was issued. The prior art key fob device in FIG. 1 can verify that the authorized user has possession of the device, but it cannot communicate with or be programmed by the majority of proprietary RFID systems due to the absence of a true proprietary RFID tag that has been programmed and assigned an authorized ID in accordance with the procedures established by the owner of the proprietary RFID system.

Figure 3:
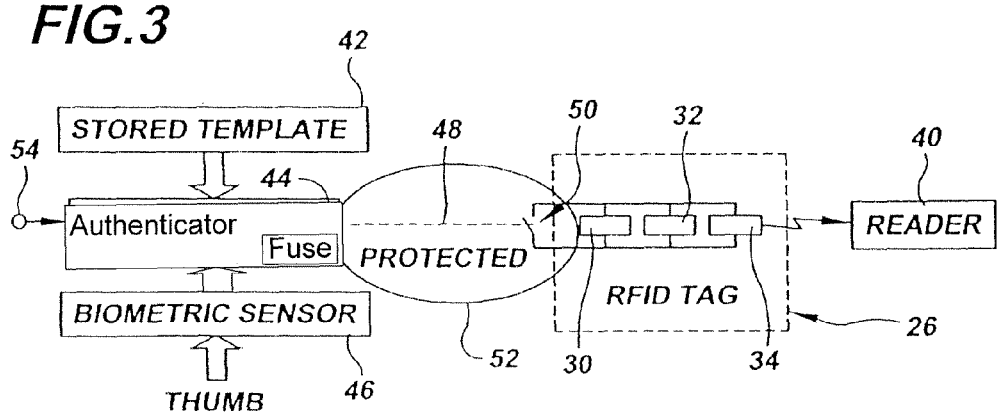
FIG. 3 is a block diagram of the present invention showing a biometrically authenticated portable RFID access device using an RFID tag securely integrated with a biometric authentication system.

Referring to FIG. 3, the biometrically authenticated portable access device of the present invention addresses these problems by incorporating an authorized RFID tag 26 of the type seen in FIG. 2 that is capable of communicating with a compatible proprietary reader 40 selected from an installed base of such readers. The device includes a stored template 42, an authenticator 44 and a biometric sensor 46. These components operate in substantially the manner described above in connection with FIG. 1. The authenticator 44 is preferably a microprocessor including program storage memory and an input port 54 for programming and setup. The authenticator 44 also includes a timer which may be implemented in software in the microprocessor or it may be in the form of separate hardware.

Biometric sensor 46 measures a live biometric parameter of an unverified user. The live biometric parameter is preferably a thumbprint, however, fingerprints iris patterns, voice signatures, facial patterns and other biometric parameters may be measured with suitable sensors. The live biometric parameter is compared with the previously measured biometric parameter of an authorized user from stored template 42 by the authenticator 44. When the live biometric parameter matches the stored biometric template, the authenticator 44 produces an authorization signal.

The authorization signal is applied over connection 48 to operate switch 50. Switch 50 is connected to the RFID tag 26 and allows it to operate only when the authorization signal is applied. When the authorization signal is not applied, switch 50 prevents the RFID tag from responding to reader 40. In the preferred design, the authenticator 44 includes a timer, which provides the authorization signal to the switch 50 for a defined period of time after the authenticator has verified the match between the live parameter and the stored template.

In the embodiment of the invention illustrated, switch 50 is an electronic switch that is normally closed, but is opened when it receives the authorization signal. In the illustrated design, the switch acts to prevent power from being wirelessly supplied to the RFID tag 26 by the RFID tag reader 40. When the switch is closed it shorts out the RFID circuit and stops it from working. The switch connects a power input to a ground input of the RFID tag to prevent an operating voltage from being provided to the RFID tag. The switch may also be connected to prevent oscillation of the tuned circuit formed by the tuning capacitor 32 and antenna coil 34.

Alternatively, the switch may be connected in the normally open configuration such that a critical connection to a component or power is made only when the switch receives the authorization signal.

Regardless of how the switch 50 is configured, it is installed in a manner that prevents it from being tampered with or modified, as indicated by the notation "Protected" and oval 52. The area in FIG. 3 indicated by oval 52 and labeled "Protected" is subject to abuse by an attacker because he could cut open the key fob and tamper with the circuit to make the RFID circuit operate when it should not. To prevent this, the switch 50 and other components of the access device may be encased in potting material, or covered with a protective film to prevent unauthorized access to the switch. If an attempt is made to breach the protection surrounding the switch, the switch is destroyed.

A suitable ASIC 30 is the Atmel T5557, which contains all of the logic, modulators, memory and the power supplies required to perform the RFID function. It also contains the essential message structuring elements required for the correct protocol between the reader 40 and the tag 26.

A valid authentication of a live thumb print versus stored template 42 results in the authorization signal being sent from the authenticator 44 to the switch 50 which is disabling the RFID circuit. The RFID circuit is allowed to be freed from its disabling clamp for a short period of time, for example 2 seconds, enough time for the user to present the key fob to proximity reader 40 and gain access to the protected resource.

The advantage of using a conventional RFID tag instead of a purpose built device is that the tag may be programmed in a conventional programmer such as exists at HID Corporation or Indala Corporation and their trusted distributors and does not require reproducing or simulating the function of the proprietary device in an RFID engine constructed from separate components.

The RFID tag 26 is preferably manufactured with the authenticator 44 locked into the positive state to continuously produce the authorization signal. The RFID tag 26 is then programmed by an authorized and compatible programmer in accordance with the applicable proprietary or nonproprietary programming methods used for other RFID tags.

Following successful programming of the RFID tag, the authenticator is then unlocked by any one of a number of non-reversible methods such as by burning a fuse in the authenticator. Alternatively the authenticator 44 may be held in its positive state by setting a bit in the memory of a microprocessor therein. This bit may be set, for example, by entering a secret code through port 54 on the microprocessor. The port 54 may also be used for entering other set-up data during manufacturing.

The access device in FIG. 3 is preferably provided with a small case and a key ring so that can be used as a key fob. Conventional mechanical keys may be stored on the key ring and used to access a protected resource having a nearby reader. The reader only permits the mechanical key to be used when the authorized RFID tag 26 is providing authorized RFID access credentials and such credentials are only supplied when the key fob is in the possession of the authorized user and the authenticator has verified that user's live biometric parameter by comparison with the stored template 42. Alternatively, the access device in FIG. 3 may be produced in a smart card format.

While the present invention has been particularly described, in conjunction with a specific preferred embodiment, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

Thus, having described the invention, what is claimed is:

1. A biometrically authenticated portable RFID access device that selectively permits energization by a tag reader, comprising:

a biometric sensor for measuring a live biometric parameter of an unverified user;

a stored biometric template corresponding to a previously measured biometric parameter of an authorized user;

an authenticator for comparing the live biometric parameter of the unverified user to the stored biometric template and producing an authorization signal when the live biometric parameter matches the stored biometric template; and an electronic switch responsive to the authorization signal from the authenticator, the electronic switch acting to enable the RFID access device to respond to energization by the tag reader only when the authorization signal from the authenticator indicates that the live biometric parameter matches the stored biometric template, wherein the RFID access device is programmable in an RFID tag programmer selected from an installed base of RFID programmers used for programming RFID access devices that do not include associated biometric sensors.

2. The biometrically authenticated portable RFID access device according to claim 1, wherein the electronic switch acts to prevent power from being wirelessly supplied to the RFID access device by the tag reader.

3. The biometrically authenticated portable RFID access device according to claim 1, wherein the electronic switch acts to prevent oscillation of a tuned circuit within the RFID access device.

4. The biometrically authenticated portable RFID access device according to claim 1, wherein the electronic switch acts to connect a power input to a ground input of the RFID access device to prevent an operating voltage from being provided to the RFID access device when the authorization signal is not provided to the switch.

5. The biometrically authenticated portable RFID access device according to claim 1, wherein the electronic switch is physically protected such that the switch is destroyed in the event that an attempt is made to access the switch.

6. The biometrically authenticated portable RFID access device according to claim 1, wherein the electronic switch is protected by a potting material that prevents access to the switch.

7. The biometrically authenticated portable RFID access device according to claim 1, wherein the biometric sensor measures fingerprints.

8. The biometrically authenticated portable RFID access device according to claim 1, wherein the biometric sensor measures thumbprints.

9. The biometrically authenticated portable RFID access device according to claim 1, wherein the authenticator provides the authorization signal to the switch for a limited period of time after the authenticator has determined that the live biometric parameter matches the stored biometric template.

10. The biometrically authenticated portable RFID access device according to claim 1, wherein the authenticator comprises a microprocessor.

11. Currently Amended) The biometrically authenticated portable RFID access device according to claim 1, wherein the authenticator is initially in a locked state providing the authorization signal to the switch and thereby enabling the RFID access device to be programmed.

12. The biometrically authenticated portable RFID access device according to claim 11, wherein the authenticator can be subsequently changed to an unlocked state thereby disabling the RFID access device unless the live biometric parameter matches the stored biometric template.

13. The biometrically authenticated portable RFID access device according to claim 12, wherein the authenticator includes a security fuse and the authenticator is changed to the unlocked state by irreversibly burning the security fuse.

14. The biometrically authenticated portable RFID access device according to claim 12, wherein the authenticator includes a port and the authenticator is changed to the unlocked state by entering a code through the port.

15. A biometrically authenticated portable RFID access device that selectively permits energization by a tag reader, comprising:
a case in the form of a key fob adapted for connection to a key ring to hold keys;
a biometric thumbprint sensor mounted in the case, the biometric thumbprint sensor producing an output corresponding to a thumbprint of an unverified user;
a digital storage for storing a biometric template corresponding to a thumbprint of an authorized user;
an authenticator in the form of a microprocessor for comparing the output of the biometric thumbprint sensor to the stored biometric template and producing an authorization signal for a limited period of time when there is a match;
an electronic switch connected to the authenticator and responsive to the authorization signal, the electronic switch opening to enable the RFID access device to respond to energization by the tag reader only when the authorization signal is received and closing to disable the RFID access device when the authorization signal is not received;
a protective compound applied at least to the switch, the protective compound destroying the switch when an attempt is made to access the switch, and
wherein the RFID access device is programmable in an RFID tag programmer selected from an installed base of RFID programmers used for programming RFID access devices that do not include associated biometric sensors.

16. The biometrically authenticated portable RFID access device according to claim 15, wherein the authenticator is initially in a locked state providing the authorization signal to the switch and thereby enabling the RFID access device to be programmed.

17. The biometrically authenticated portable RFID access device according to claim 16, wherein the authenticator can be subsequently changed to an unlocked state thereby disabling the RFID access device after programming until the authenticator determines that the output of the biometric thumbprint sensor matches the stored biometric template and produces the authorization signal.

18. The biometrically authenticated portable RFID access device according to claim 17, wherein the authenticator includes a security fuse and the authenticator is changed to the unlocked state by irreversibly burning the security fuse.

19. The biometrically authenticated portable RFID access device according to claim 17, wherein the authenticator includes a port and the authenticator is changed to the unlocked state by entering a code through the port.

* * * * *